Patented Oct. 5, 1954

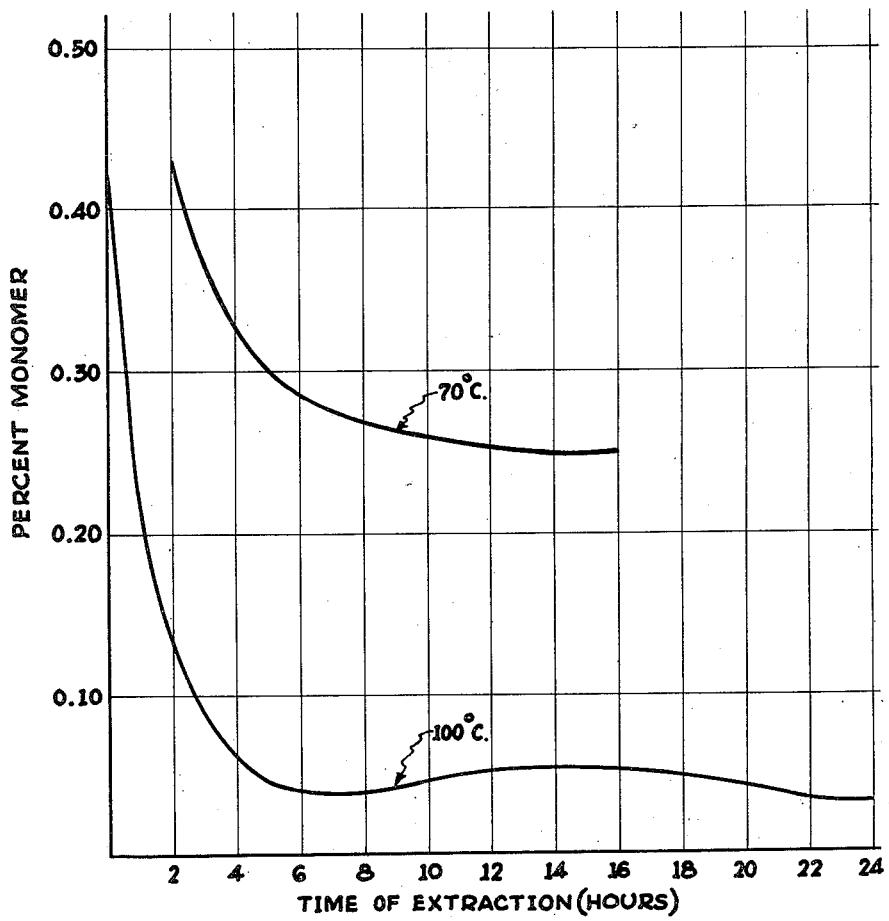

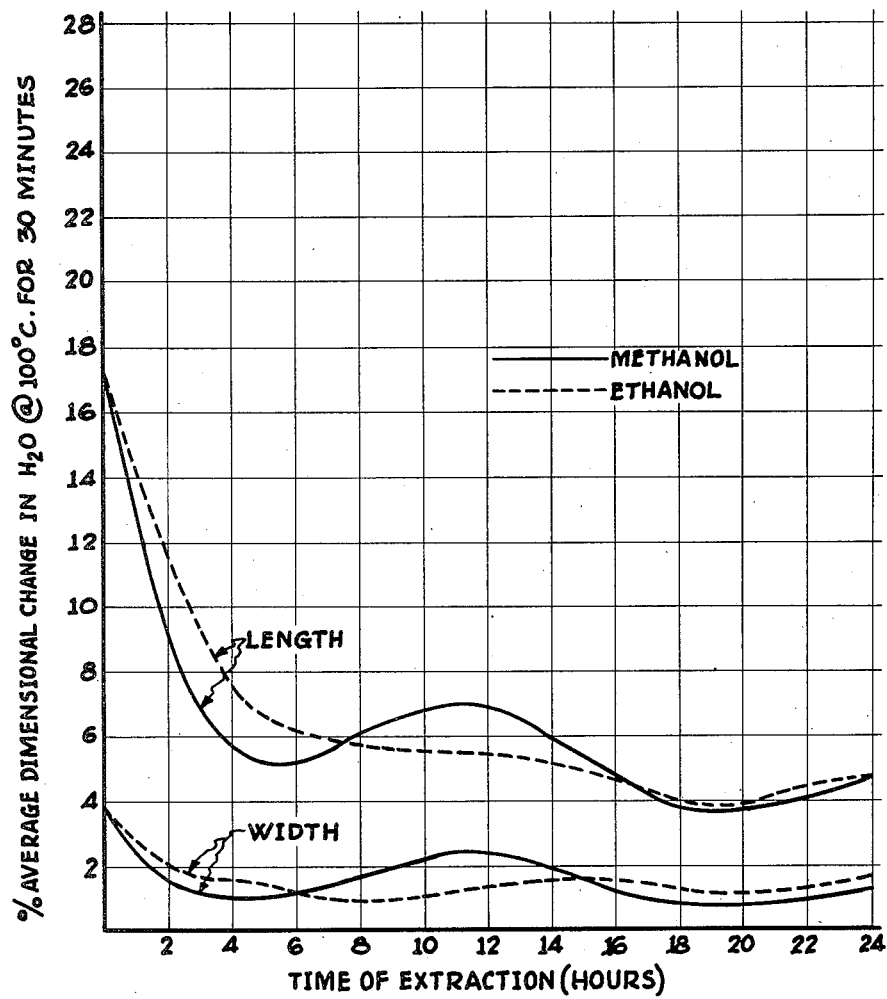

2,691,008

UNITED STATES PATENT OFFICE 2,691,008

EXTRACTION PROCESS FOR POLYMER PARTICLES

John Marshall Grim, Pittsburgh, Pa., assignor to Koppers Company, Inc., a corporation of Delaware Application February 21, 1950, Serial No. 145,386

18 Claims. (Cl. 260—93.5)

This invention relates to the extraction of polymer particles to remove impurities. More specifically, it relates to a process using a suspension agent to stabilize the suspension of polymer particles in an extracting liquid medium.

It has been known that certain properties of polymers, such as resistance to shrinkage, to discoloration, to crazing and to heat-distortion, may be improved by the removal of unpolymerized monomer, low-molecular-weight polymers, monomer impurities, catalyst residues, etc., hereinafter referred to collectively as low-molecular-weight components or materials. Various methods of removing these low-molecular-weight materials have been employed, such as heating under high vacuum, steam distillation, precipitation of polymer from solution, etc. However, these methods require expensive equipment and techniques and are sometimes inefficient. Heretofore, attempts to extract these low-molecular-weight components from these polymeric materials by the use of solvents for the low-molecular-weight materials, which solvents are non-solvents for the polymer, usually have resulted in agglomeration and lump formation of the polymer particles, especially since extraction are generally more effective at temperatures close to or above the heat distortion temperature of the polymer.

It has now been found that low-molecular-weight components may be removed from polymer particles, such as beads, powder, granules, etc. by treatment with an extractant, which is a solvent for the low-molecular-weight components and a non-solvent for the polymer, simultaneously with a suspension agent which prevents agglomeration and lumping of the polymer particles.

The exact manner of practicing the invention depends on a number of factors which include (1) the polymer or copolymer to be purified, (2) the extractant which is used, (3) the suspension agent which is suitable for use with the particular extractant, (4) the conditions of the extraction procedure, such as the temperature, the number of extraction cycles, the proportion of extractant to polymer and of suspension agent to polymer, the efficiency of agitation, etc., and (5) the property change desired in the polymer.

Figure 1 illustrates the effect of temperature on the efficiency of the extraction process. Figure 2 shows the improvement in shrink resistance for polystyrene extracted with methanol and with ethanol by the practice of this invention.

The process of this invention is applicable to any resinous or polymeric material from which it is desirable to extract low-molecular-weight components, especially from polymeric materials which have therein residual monomer, monomer impurities, monomer solvents, catalysts fragments, polymerization by-products, low-molecular-weight polymers, etc., such materials being considered as impurities in the high-molecular-weight polymers which act unfavorably on various properties of the polymers. The practice of the invention is especially advantageous, as shown hereinafter, in the purification of polymeric vinyl aryl compounds, particularly polystyrene as shown by the improvements effected in its shrink-resistance and other properties.

The choice of extractants depends on the polymeric material which is to be purified. In any case, as previously stated, the extractant should have good solvent power toward the impurities and should be a non-solvent for the polymer. Moreover, the extractant is advantageously a non-swelling agent for the polymer, although this factor may not be too important if the effects on the physical properties of the polymer can be disregarded as in the case of analytical determinations of extractable components of a polymeric material. In some cases it may be desirable to follow the use of a swelling solvent by an extraction with a non-swelling solvent to remove residual swelling solvent as illustrated hereinafter by Example V. For vinyl aromatic polymers the low-molecular-weight monohydric alcohols are suitable as extracting solvents or extractants, advantageously those having three or less carbon atoms. With polystyrene methanol is a non-swelling extractant, whereas ethanol, propanol and isopropanol are swelling extractants. As illustrated hereinafter, methanol as the extractant and zinc oxide as the dispersing agent is a preferred combination for polystyrene.

With non-swelling extractants, the suspension stabilization is accomplished with a greater variety of suspension agents; however, with swelling extractants, agglomeration or lumping of the polymer particles is satisfactorily prevented only by the stabilizers more efficient for these suspensions, such as zinc oxide. Thus, zinc oxide is very effective for the practice of this invention when polystyrene beads are extracted with methanol, a non-swelling extractant, or with ethanol, propanol or isopropanol, swelling extractants. Tricalcium phosphate, magnesium phosphate, barium phosphate, aluminum phosphate, calcium carbonate, calcium fluoride, polyvinyl alcohol, sodium carboxy methyl cellulose, talc, kaolin, kieselguhr, aluminum oxide, barium sulfate, magnesium carbonate, ferric carbonate, magnesium silicate, etc., are also suitable for use with methanol but sometimes do not sufficiently stabilize polystyrene suspensions in propanols. Hydroxy apatite is usually effective with the extraction of polystyrene when methanol or ethanol is used but is not as efficient in preventing agglomeration of the polymer beads when the propanols are used. Thus the efficiency of the various suspension agents can be seen to vary in accordance with the extractant being used. Moreover, the efficiency of the individual solid, insoluble suspension agents vary somewhat in accordance with their particle size; that is, the efficiency generally increases with finer particle size, submicronic particle size in such cases being particular advantageous. When the suspension agent is substantially all of especially fine particle size, the amount of suspension agent required for stabilization may be very small, e. g., as low as 0.03% by weight based on the polymer. When the suspension agent is obtained commercially, the particle size is generally larger than when freshly prepared, and therefore larger amounts may be required for stabilization. Furthermore, the stability of these suspensions may be varied to some extent by the amount of agitation, more vigorous agitation being beneficial to stabilization.

Very often a suspension agent which is suitable for use in the preparation of a polymer by bead polymerization of the monomer is also suitable for use as the suspension agent with such a polymer in the extraction process of this invention. In such cases, it is usually desirable to retain the suspension agent on the polymer beads by eliminating the usual washing step. Thus the polymer beads are ready for extraction immediately after the aqueous suspension medium has been drained from the polymer beads. Suspension agents which are especially adaptable to such practice are hydroxy apatite and magnesium phosphate. When such suspension agent coatings are thus retained on the polymer beads, the efficiency of the suspension agents is generally increased, sometimes permitting the use of propanols where they were not otherwise suitable. Other materials suitable for such dual purpose include tricalcium phosphate, barium phosphate, aluminum phosphate, zinc oxide, bentonite, calcium carbonate, calcium fluoride, polyvinyl alcohol, sodium carboxy methyl cellulose, etc.

Conditions suitable for the practice for the invention depend to some extent on the reagents used. Thus suitable temperatures are determined somewhat by the characteristics of the polymeric material and the extractant being used as well as by the duration of extraction, the number of extraction cycles, the ratio of extractant to polymer, the degree of purification and the ultimate polymer properties desired. Usually within moderate temperature ranges, e. g., about 70–130° C., the rate of extraction increases with increase in temperature as shown in Figure I. The upper limit on the temperature obviously depends on the limits of the pressure equipment being used, the economics of supplying heat, the effects of increased temperature on the solvent power or swelling power of the extractant on the polymer, etc. Lower limits on suitable temperatures are dependent on permissible minimum rates of extraction or the solvent power of the extractant for the impurities. With polystyrene a minimum temperature for methanol extraction appears to be about 70° C., a very satisfactory temperature range is about 100–110° C., and no particular advantage appears for the use of temperatures above approximately 130° C., especially since the economic factors with regard to the type of equipment required and the cost of supplying heat are unfavorable.

The time required for satisfactory extraction depends on too many factors for even an approximate determination of limits, for example, the temperature, the solvent power of the extractant for the impurities, the number of extraction cycles, the ratio of extractant to polymer, the desired degree of purification, the extent of change desired in the properties of the product and the size of the polymer particles. Extraction periods giving satisfactory results are illustrated hereinafter in the examples. Suitable ratios of suspension agent to polymer also depend somewhat on the type and particle size of the suspension agent, the solvent, the polymer, the amount of agitation, etc. Whereas as little as 0.03% suspension agent may be used when the agent is substantially all of especially fine particle size, it is generally advantageous to use at least 0.3% based on the weight of polymer. The upper limits on amount of suspension agent are determined mainly by economic factors and usually do not exceed 5–10% by weight. Satisfactory ratios of extractant to polymer will obviously vary with a number of factors such as solvent power for the impurities, percent impurities in the polymer, temperature, etc. It is generally satisfactory, however, to have at least a weight of extractant approximately equivalent to the weight of polymer treated, and advantageously in many cases to have a weight of extractant at least 1.5 or more times that of the polymer.

The invention is best described by the following examples which are intended, not as a limitation on the invention, but to illustrate various methods by which the invention may be practiced. In the examples and throughout the specification, the terms "parts" and "percentages" are intended to mean parts by weight and percentages by weight. Monomer contents are determined by ultraviolet spectra-photometric analysis according to the method described in Analytical Chemistry 20, 312 (1938). The standard shrinkage or boiling test consists of immersion of polymer samples for 30 minutes in boiling water, a 100° C. temperature being maintained by the addition of sufficient salt and by continuous reflux. The shrinkage tests were made on test bars prepared by injection molding. The bars as molded were 8½" x ⅛" x ¾" but were cut to 4¼" x ⅛" x ¾" before the boiling test.

EXAMPLE I

Into four glass bottles were placed charges of identical polystyrene bead samples, each charge being 100 parts, together with 160 parts of methanol and one part of zinc oxide. The air in each bottle was replaced with nitrogen, and the bottles were then sealed by aluminum-lined caps. These bottles were placed on a wheel which revolved at 13 R. P. M. through a constant temperature bath maintained at 70° C. The contents of the bottles were thus heated and agitated from the periods indicated in the table below. After heating for the designated period, each bottle was removed from the constant temperature bath and allowed to stand until the temperature dropped below 50° C. at which time the bottle was opened. The values of the monomer content, shrinkage and heat-distortion temperature were determined in each case and were as indicated in the table below, and the percent monomer versus extraction time is plotted in Figure 1.

| Time (Hrs.) | Percent Monomer | Average Shrinkage | | Heat Distortion, ° C. |
|---|---|---|---|---|
| | | Length | Width | |
| 0 | 0.42 | 17.2 | 3.84 | 91.4 |
| 2 | 0.42 | 14.7 | 4.2 | 93.6 |
| 4 | 0.29 | 17.9 | 3.3 | 90.5 |
| 6 | 0.29 | 16.4 | 3.2 | 92.8 |
| 16 | 0.25 | 11.2 | 1.9 | 94.1 |

EXAMPLE II

The extraction procedure of Example I was repeated with a number of samples of identical polystyrene beads having an original monomer content of 0.42%, using a temperature of 100° C. with methanol, ethanol, propanol and isopropanol as extractants. The alcohols higher than methanol are progressively more effective than methanol in removing the monomer from the beads. At the same time the heat distortion temperature is lower and the shrinkage of molded test bars is greater. This indicates that the higher alcohols cause the beads to swell, and later this swelling is reflected in the shrinkage and heat distortion tests. The following table shows the results. Figure 1 shows a curve of percent monomer versus time of extraction for the methanol treatments, and Figure 2 shows the average change in length and in width plotted against time of extraction for the methanol and ethanol treatments.

| Time (Hrs.) | Alcohol | Percent Monomer | Average Shrinkage | | Heat Distortion, ° C. |
|---|---|---|---|---|---|
| | | | Length | Width | |
| 0 | Methanol | 0.42 | 17.2 | 3.84 | 91.4 |
| 2 | do | 0.11 | 9.3 | 1.5 | 95.2 |
| 4 | do | 0.05 | 5.0 | 1.1 | 94.1 |
| 12 | do | 0.04 | 6.9 | 2.3 | 95.0 |
| 18 | do | 0.05 | 3.5 | 0.9 | 94.3 |
| 24 | do | 0.03 | 4.3 | 1.1 | 94.2 |
| 2 | Ethanol | 0.09 | 12.4 | 1.9 | 89.9 |
| 4 | do | 0.07 | 7.1 | 1.5 | 90.6 |
| 12 | do | 0.06 | 5.4 | 1.3 | 91.6 |
| 18 | do | 0.04 | 3.9 | 1.3 | 90.7 |
| 24 | do | 0.03 | 4.3 | 1.4 | 92.4 |
| 2 | Propanol | 0.0 | 32.2 | 9.2 | 88.5 |
| 4 | do | 0.0 | 31.8 | 8.7 | 88.4 |
| 12 | do | 0.0 | 24.8 | 6.2 | 88.9 |
| 18 | do | 0.0 | 11.7 | 2.3 | 91.5 |
| 24 | do | 0.01 | 31.6 | 6.4 | 89.0 |
| 2 | Isopropanol | 0.0 | 9.7 | 1.7 | 92.0 |
| 4 | do | 0.0 | | | |
| 12 | do | 0.0 | 6.9 | 1.6 | 92.5 |
| 18 | do | 0.0 | 11.3 | 2.4 | 90.7 |
| 24 | do | 0.0 | 28.0 | 7.9 | 90.5 |

EXAMPLE III

The extraction procedure of Example I was repeated for a number of identical polystyrene bead samples containing an original monomer content of 0.42%. These extractions were conducted at 100° C. and in four-hour cycles, the number of cycles and the alcohols used being indicated in the following table together with the changes effected by the extractions. As in the preceding example, use of alcohols higher than methanol, although giving good monomer reduction, resulted in considerable shrinkage, possibly because of the swelling effect.

| Cycles | | Alcohol | Percent Monomer | Average Shrinkage | | Heat Distortion, ° C. |
|---|---|---|---|---|---|---|
| Length, Hr. | Number | | | Length | Width | |
| | 0 | Methanol | 0.42 | 17.2 | 3.84 | 91.4 |
| 4 | 1 | do | 0.02 | 4.7 | 1.1 | |
| 4 | 2 | do | 0.0 | 2.2 | 0.3 | |
| 4 | 3 | do | 0.0 | 1.4 | 0.1 | |
| 4 | 4 | do | 0.0 | 1.9 | 0.39 | 96.4 |
| 4 | 1 | Ethanol | 0.04 | | | |
| 4 | 2 | do | 0.0 | | | |
| 4 | 4 | do | 0.0 | 17.3 | 2.5 | 90.3 |
| 4 | 1 | Propanol | 0.0 | | | |
| 4 | 1 | Isopropanol | 0.0 | | | |

EXAMPLE IV

The extraction procedure of Example I was repeated with a number of samples of polystyrene beads prepared by a process which gives polystyrene beads having a monomer content of substantially zero. The extraction was conducted at 100° C. and in four-hour cycles with the used methanol being removed and fresh methanol added before each cycle. The effects of the various extractions on the shrinkage and heat distortion are indicated in the table below.

| Cycles | | Average Shrinkage | | Heat Distortion, ° C. |
|---|---|---|---|---|
| Length, Hr. | Number | Length | Width | |
| | 0 | 5.37 | 1.08 | 95.7 |
| 4 | 1 | 3.5 | 0.6 | 94.5 |
| 4 | 2 | 2.7 | 0.3 | 94.7 |
| 4 | 3 | 2.1 | 0.35 | 96.1 |
| 4 | 4 | 2.1 | 0.3 | 95.5 |
| 4 | 5 | 2.2 | 0.3 | 95.9 |
| 4 | 6 | 2.8 | 0.5 | 95.5 |

EXAMPLE V

Polystyrene beads, similar to those used in the preceding example (having an initial monomer content of substantially zero), were extracted at 100° C. in three cycles of four hours each using isopropanol for the first cycle and methanol for the last two cycles according to the technique of Example I.

| Cycles | Alcohol | Average Shrinkage | | Heat Distortion, ° C. |
|---|---|---|---|---|
| | | Length | Width | |
| 0 | | 5.37 | 1.08 | 95.7 |
| 1 | Isopropanol | | | |
| 2 | Methanol | | | |
| 3 | do | 2.34 | 0.32 | 95.4 |

EXAMPLE VI

The extraction procedure of Example I was repeated using various samples of identical polystyrene beads as used in Example IV (having a monomer content of substantially zero). These extractions were conducted with methanol at 110° C. using various numbers of cycles, the number of cycles and the duration of each cycle being as indicated in the table below. Satisfactory extraction conditions are obtained under these circumstances with one extraction of 0.5 hour. Although 2.4 cycles of two hours each do offer some advantages, they do not appear sufficient to warrant the additional expense and time required for the longer and greater number of cycles. (There is some inaccuracy in the time of extraction, however, due to the fact that in each case approximately 80 minutes was required to raise the temperature of the bath from 70° to 110° C. and likewise to lower it from 110° to 70° C.)

| Cycles | | Average Shrinkage | | Heat Distortion, ° C. |
| --- | --- | --- | --- | --- |
| Length | Number | Length | Width | |
|  | 0 | 5.37 | 1.08 | 95.7 |
| 0.5 | 1 | 1.76 | 0.51 | 94.6 |
| 0.5 | 2 | 3.53 | 1.14 | 95.1 |
| 0.5 | 3 | 3.36 | 1.11 | 96.8 |
| 0.5 | 4 | 2.99 | 0.84 | 96.2 |
| 2.0 | 1 | 2.23 | 0.32 | 95.4 |
| 2.0 | 2 | 1.31 | 0.29 | 96.2 |
| 2.0 | 3 | 1.36 | 0.23 | |
| 2.0 | 4 | 1.39 | 0.20 | |
| 4.0 | 1 | 1.89 | 0.25 | 94.5 |
| 4.0 | 2 | 20.4 | 0.30 | 95.0 |
| 4.0 | 3 |  |  | 95.7 |
| 4.0 | 4 | 2.65 | 0.47 | 96.0 |

EXAMPLE VII

A series of styrene-2,5-dichlorostyrene copolymers containing the various mole percentages of 2,5-dichlorostyrene indicated below in Table I were prepared by suspension polymerizations using approximately 4.2 parts of hydroxy apatite (substantially all having submicronic particle size) per 100 parts of polymerizable monomer used. The polymer bead products when separated from the water suspension medium had hydroxy apatite coatings of approximately 0.8 parts per 100 parts of polymer. These amounts of hydroxy apatite were sufficient to stabilize the beads against agglomeration during these two-hour methanol extractions at 110° C. using a polymer-methanol ratio of 100–160 parts to give the results indicated below in Table I.

Methanol-soluble determinations were made in each case by dissolving an acid-washed and dried sample of the polymer beads, dissolving this in toluene, precipitating with methanol, and then, after separating and drying the precipitate, determining by loss in weight the weight of material which remained dissolved in the methanol. These determinations were made on samples of the beads before and after the methanol extractions, and the results are given below in Table I.

Table I

| Mol Percent 2,5-Dichlorostyrene | Percent Original Methanol Solubles | Percent Final Methanol Solubles |
| --- | --- | --- |
| 0 | 0.9 | 0.8 |
| 10 | 1.3 | 0.5 |
| 20 | 1.5 | 0.3 |
| 30 | 0.9 | 0.8 |
| 45 | 1.1 | 0.8 |
| 50 | 1.6 | 1.0 |
| 60 | 1.8 | 1.1 |
| 70 | 1.6 | 1.0 |
| 90 | 2.8 | 1.2 |
| 100 | 3.4 | 0.8 |

A similar experiment using polystyrene beads coated with magnesium phosphate, as produced by a similar suspension polymerization as referred to immediately above, wherein submicronic magnesium phosphate was used as the dispersing agent, was likewise successful in preventing agglomeration of the beads during extractions using polymer-methanol weight ratios of 100–320 and 100–160 at 100° C.

Polymeric materials which may be extracted according to the practice of this invention comprise polymers of $CH_2=C<$-containing compounds and their copolymers with each other or with other polymerizable ethylenic compounds. These $CH_2=<$-containing compounds include vinyl and vinylidene compounds such as vinyl aromatic compounds, for example styrene, vinyl naphthalene, vinyl diphenyl, etc. and their substituted derivatives, e. g. the alkyl, cycloaliphatic, aryl, alkoxy, acetoxy, acyl, halo, cyano, etc. derivatives including ortho-, meta- and para-methyl-styrenes, 3,5- and 2,4-dimethyl-styrenes, ortho-, meta- and para-ethyl-styrenes, diethyl-styrenes, isopropyl-styrenes, para-cyclohexyl-styrene, para-phenyl-styrene, ortho-, meta- and para-methoxy-styrenes, para-acetoxy-styrene, p-acetyl-styrene, ortho-, meta- and para-chloro-styrenes, dichlorostyrenes, ortho-, meta- and para - fluoro - styrenes, difluorostyrenes, para-(chloro-methyl)-styrene, chloro - methyl - styrenes, i. e. 2-chloro-4-methyl-styrene, etc., ortho-, meta- and para-trifluoromethyl-styrenes, di-(trifluoromethyl)-styrenes, ortho-, meta- and para-cyano-styrenes, dicyano-styrenes, (cyano-methyl)-styrenes, cyano-methyl-styrenes, i. e. 2-cyano-4-methyl-styrene, etc., and corresponding derivatives of other vinyl aromatics; acrylic, alpha-methacrylic and alpha-chloroacrylic acids, esters, i. e. methyl esters, etc., amides and nitriles; vinyl halides, i. e. vinyl chloride, vinyl fluoride, etc.; vinylidene halides, i. e. vinylidene chloride, vinylidene fluoride, etc.; ethylene; isobutylene; vinyl esters such as vinyl acetate, vinyl propionate, vinyl benzoate, etc.; vinyl ethers, i. e. divinyl ether, vinyl-isopropenyl ether, vinyl-methyl ether, vinyl-ethyl ether, etc., vinyl ketones, i. e. divinyl ketone, methyl vinyl ketone, methyl ethyl ketone, acrylophenone; N-vinyl amides, imides and lactams such as N-vinyl acetamide, N-vinyl succinimide, N-vinyl phthalimide, N-vinyl maleimide, N-vinyl caprolactam, etc.

Copolymers which may be used in the practice of this invention include those made from mixtures containing any number of the vinyl and vinylidene compounds listed above, such as dipolymers, tripolymers, tetrapolymers, pentapolymers, etc., for example, such heteropolymers as made from mixtures of styrene, alpha-methyl-styrene and divinyl benzene; styrene, vinyl naphthalene, alpha-methyl-styrene and divinyl benzene; styrene, vinylidene chloride and vinyl acetate; vinylidene chloride, acrylonitrile and vinyl acetate; vinylidene chloride, styrene, methacrylamide, and methyl vinyl ketone; vinylidene chloride, methyl methacrylate, acrylonitrile, styrene, and methacrylamide; methyl methacrylate, acrylonitrile, styrene, maleic anhydride and dimethyl maleate; etc. Obviously, the choice of extractant and conditions suitable for such copolymers will vary according to the properties and characteristics of the copolymers.

In the practice of this invention, the agitation of the suspension should be at least sufficient to prevent the suspension agent from settling. In many instances the efficiency of the suspension agent can be aided by vigorous agitation. Usually, any arrangement is satisfactory which provides motion to the suspension sufficient to prevent settling. Stirrers, paddles, shaking devices, etc., may suitably provide the required amount of agitation. The heating means may comprise any of the common methods such as steam or hot water circulating through a jacket or coils located so as to convey heat to the suspension system and permit maintenance and control at a desired temperature. For efficient practice of the invention the polymer particles are advantageously less than about ¼", advantageously less than about ⅛" in diameter.

In addition to improving the properties of polymers as indicated above, the extraction process of this invention is very well suited to analytical determinations directed to a study of the nature and quantity of plasticizers, stabilizers, dyes, etc. which are present in a polymeric material. Formerly, an analysis of polymeric materials for such substances usually involved dissolving the polymeric material in a solvent for the polymer and separating the polymer from the other components in solution either by precipitation of the polymer or by extraction with another solvent which is a non-solvent for the polymer and for the polymer-solvent. These techniques involve the use of considerable amounts of solvent and very often are very inefficient or tedious procedures. By the practice of the present invention the separation of plasticizers, stabilizers, etc. can be very simply and efficiently accomplished. When the invention is thus practiced for analytical purposes, there is usually no concern for retaining or protecting the physical or thermal properties of the polymer, and therefore there is no objection and sometimes there are advantages in using swelling solvents. Under these circumstances, in addition to methanol, ethanol and the propanols, such notorious swelling agents as the alcohols of four, five and more carbon atoms can also be very effectively employed for the extraction of polymeric vinyl aromatic compounds, such as polystyrene.

Moreover, the process of this invention can be used to separate a soluble polymer from a mixture of polymers. Thus, by selection of an extractant which is a solvent for one polymer and both the extractant itself and a solution of the soluble polymer in the extractant are non-solvents for the other polymer or polymers, the first polymer can be separated from a mixture of polymers containing it.

The invention as hereinbefore set forth is embodied in particular form and manner but may be variously embodied within the scope of the claims hereinafter made.

What is claimed is:

1. In a process for treating polymeric vinyl aryl compound particles to separate low-molecular-weight components therefrom, the steps which comprise forming a suspension of the polymer particles and a suspension stabilizer chosen from the class consisting of tricalcium phosphate, magnesium phosphate, barium phosphate, aluminum phosphate, calcium fluoride, talc, kaolin, kieselguhr, aluminum oxide, barium sulfate, zinc oxide, magnesium carbonate, and ferric carbonate in a liquid medium consisting essentially of an alcohol containing less than four carbon atoms maintaining said polymer particles in contact with said liquid medium whereby low-molecular-weight components are extracted by said liquid medium and separating the purified polymer particles from said liquid medium.

2. The process of claim 1 in which the vinyl aryl compound comprises styrene.

3. The process of claim 1 in which the vinyl aryl compound comprises styrene and the suspension stabilizer is an inorganic suspension stabilizer.

4. The process of claim 1 in which the vinyl aryl compound comprises styrene and the suspension stabilizer is zinc oxide.

5. The process of claim 1 in which the vinyl aryl compound comprises styrene and the suspension stabilizer is hydroxy apatite.

6. The process of claim 1 in which the vinyl aryl compound comprises styrene and the suspension stabilizer is magnesium phosphate.

7. The process of claim 1 in which the alcohol is methanol.

8. The process of claim 1 in which the alcohol is ethanol.

9. The process of claim 1 in which the vinyl aryl compound is polystyrene.

10. The process of claim 1 in which the vinyl aryl compound is polystyrene, the suspension stabilizer is zinc oxide, and the alcohol is methanol.

11. The process of claim 1 in which the temperature of suspension is in the range of about 70° C. to about 130° C.

12. The process of claim 11 in which the vinyl aryl compound is polystyrene, the suspension stabilizer is zinc oxide, and the alcohol is methanol.

13. The process of claim 11 in which the vinyl aryl compound is polystyrene, the suspension stabilizer is hydroxy apatite, and the alcohol is methanol.

14. The process of claim 11 in which the vinyl aryl compound is polystyrene, the suspension stabilizer is magnesium phosphate, and the alcohol is methanol.

15. The process of claim 1 in which the temperature of the suspension is in the range from about 100° C. to about 110° C.

16. The process of claim 15 in which the vinyl aryl compound is polystyrene, the suspension stabilizer is zinc oxide, and the alcohol is methanol.

17. The process of claim 15 in which the vinyl aryl compound is polystyrene, the suspension stabilizer is hydroxy apatite, and the alcohol is methanol.

18. The process of claim 15 in which the vinyl aryl compound is polystyrene, the suspension stabilizer is magnesium phosphate, and the alcohol is methanol.

References Cited in the file of this patent

UNITED STATES PATENTS

| Number | Name | Date |
| --- | --- | --- |
| 2,331,273 | Loury | Oct. 5, 1943 |
| 2,403,966 | Brown | July 16, 1946 |
| 2,408,007 | Thomas | Sept. 24, 1946 |
| 2,456,265 | Frolich | Dec. 14, 1948 |
| 2,507,153 | Gearhart | May 9, 1950 |
| 2,514,191 | Rowland | July 4, 1950 |
| 2,523,289 | Frolich | Sept. 26, 1950 |
| 2,538,273 | Rhines | Jan. 16, 1951 |